United States Patent [19]
Otake et al.

[11] Patent Number: 5,994,485
[45] Date of Patent: Nov. 30, 1999

[54] VINYL CHLORIDE/VINYL ACETATE COPOLYMER, BINDER FOR A MAGNETIC RECORDING MEDIUM, AND MAGNETIC RECORDING MEDIUM

[75] Inventors: Hirohisa Otake; Yukihisa Hoshino, both of Shibukawa, Japan

[73] Assignee: Denki Kagaku Kogyo Kabushiki Kaisha, Tokyo, Japan

[21] Appl. No.: 09/081,282

[22] Filed: May 20, 1998

[30] Foreign Application Priority Data

May 27, 1997 [JP] Japan ................................. 9-136463
Feb. 13, 1998 [JP] Japan ................................. 10-046418

[51] Int. Cl.$^6$ ............................. B05D 5/12; C08K 3/22; C08K 3/08; C08F 2/18

[52] U.S. Cl. ....................... 526/205; 524/406; 524/431; 524/440; 526/222; 526/224; 526/240; 526/241; 526/286; 526/330; 526/345; 427/128

[58] Field of Search ................................. 524/406, 431, 524/440; 526/205, 222, 224, 240, 241, 286, 330, 345

[56] References Cited

U.S. PATENT DOCUMENTS

| | | | |
|---|---|---|---|
| 2,300,920 | 11/1942 | Hever | 526/345 |
| 2,852,499 | 9/1958 | Benedict et al. | 526/330 |
| 3,172,877 | 3/1965 | Fishbein et al. | 526/330 |
| 3,317,495 | 5/1967 | Jones et al. | 526/345 |
| 3,523,109 | 8/1970 | Diessel et al. | 526/345 |
| 3,523,111 | 8/1970 | Bibeau et al. | 526/330 |
| 3,583,956 | 6/1971 | Pointer et al. | 526/330 |
| 3,637,625 | 1/1972 | Buning et al. | 526/330 |
| 4,013,608 | 3/1977 | Nagoshi et al. | 526/330 |
| 4,818,781 | 4/1989 | Yamakawa et al. | 524/431 |
| 4,963,592 | 10/1990 | Sharaby | 526/205 |
| 5,246,788 | 9/1993 | Carlson | 526/431 |
| 5,702,757 | 12/1997 | Ohmura | 524/431 |

FOREIGN PATENT DOCUMENTS

0 243 820  11/1987  European Pat. Off. .

*Primary Examiner*—Peter A. Szekely
*Attorney, Agent, or Firm*—Oblon, Spivak, McClelland, Maier & Neustadt, P.C.

[57] ABSTRACT

A vinyl chloride/vinyl acetate copolymer characterized in that it has a peak at a signal position of from 6.0 to 8.0 ppm in the $^1$H-NMR measurement.

13 Claims, 6 Drawing Sheets

VINYL CHLORIDE/VINYL ACETATE COPOLYMER, BINDER FOR A MAGNETIC RECORDING MEDIUM, AND MAGNETIC RECORDING MEDIUM

The present invention relates to a vinyl chloride/vinyl acetate copolymer which is excellent in dispersibility of a magnetic powder and useful for a binder for a magnetic recording medium.

A magnetic recording medium such as a magnetic tape or a floppy disc is widely used. Such a magnetic recording medium has a magnetic layer comprising a magnetic powder, a binder for a magnetic recording medium, etc., formed on a support such as a plastic film. The magnetic layer is formed by coating, a magnetic coating material comprising a magnetic powder, a binder, a solvent and other additives on a film.

For the binder for a magnetic recording medium, a vinyl chloride/vinyl acetate copolymer is widely used. For example, JP-A-60-101161 and JP-A-60-121514 disclose a binder for a magnetic recording medium made of vinyl chloride, vinyl acetate and an unsaturated sulfonic acid or an alkali metal salt thereof.

JP-A-60-235814 discloses a binder for a magnetic recording medium made of vinyl chloride, a monomer having a strongly acidic group containing sulfur or phosphorus, a monomer having a -X-OH group and other monomers including vinyl acetate.

JP-A-8-339527 discloses a vinyl chloride polymer having a peak value of a styrene-calculated molecular weight within a range of from 10,000 to 18,000, as a binder for a magnetic recording medium, of a magnetic layer.

In addition to those mentioned above, many attempts have been made to modify a vinyl chloride/vinyl acetate copolymer with a small amount of a third monomer, etc., to obtain a high performance binder for a magnetic recording medium.

Improvement of such a binder for a magnetic recording medium is intended primarily to improve the performance of the magnetic recording medium, particularly the recording density. For improvement of the performance, the magnetic powder has also changed from a magnetite powder to a metal powder having a stronger coercive force. When the magnetite powder and the metal powder are compared, the metal powder has a stronger coercive force and is a finer powder, whereby it tends to be difficult to sufficiently disperse it to obtain a magnetic coating material. A binder which has higher dispersibility and which can be used for both the metal powder and the magnetite powder, is desired.

The magnetic coating material is required to provide good performance which will not deteriorate as the time passes. The magnetic powder in a magnetic coating material tends to agglomerate, whereby there is a problem that the viscosity of the magnetic coating material tends to increase as the time passes, or when formed into a magnetic layer, the surface smoothness of the coating surface tends to be remarkably poor due to agglomeration of the magnetic powder, thus leading to a substantial decrease in gloss or in the signal/noise (S/N) ratio. There is a problem that the performance deteriorates as the time passes, although there may be no problem if the coating material is used immediately after its preparation.

The magnetic coating material is coated on a film, and then subjected to a magnetic field to align the magnetic powder. At that time, for the magnetic powder to be readily aligned, the viscosity of the coating material is required to be not excessively thixotropic. The viscosity of the magnetic coating material depends largely on the performance of the binder for a magnetic recording medium. From this viewpoint, the binder for a magnetic recording medium is required to be such that when made into a magnetic coating material, it will not make the coating material excessively thixotropic.

The present invention is intended to provide a vinyl chloride/vinyl acetate copolymer which solves the above-described problems. Further, it is an object of the present invention to provide a coating material which is free from deterioration in performance with time and which is capable of maintaining a proper viscosity and to provide a magnetic recording medium excellent in the magnetic properties, by using the vinyl chloride/vinyl acetate copolymer having excellent dispersibility of magnetic powder for both the metal powder and the magnetite powder.

The present invention provides a vinyl chloride/vinyl acetate copolymer, characterized in that it has a peak at a signal position of from 6.0 to 8.0 ppm in the hydrogen-nuclear magnetic resonance ($^1$H-NMR) measurement, produced by copolymerizing a vinyl chloride monomer and a vinyl acetate monomer under certain specific reaction condition; a binder for a magnetic recording medium comprising such a copolymer; a magnetic coating material using such a binder for a magnetic recording medium; and a magnetic recording medium using such a magnetic coating material. The present invention includes the following embodiments.

1. A vinyl chloride/vinyl acetate copolymer characterized in that it has a peak at a signal position of from 6.0 to 8.0 ppm in the $^1$H-NMR measurement.
2. A vinyl chloride/vinyl acetate copolymer characterized in that it has a peak at a signal position of from 6.9 to 7.1 ppm in the $^1$H-NMR measurement
3. A vinyl chloride/vinyl acetate copolymer characterized in that it has peaks at respective signal positions of from 6.9 to 7.1 ppm, from 7.2 to 7.4 ppm and from 7.5 to 7.7 ppm in the $^1$H-NMR measurement.
4. The vinyl chloride/vinyl acetate copolymer according to any one of Items 1 to 3, which is produced by adding a vinyl chloride monomer, a vinyl acetate monomer and from 0.01 to 5 wt %, based on the total amount of the monomers, of a mercapto compound containing a heterocyclic group, followed by suspension polymerization.
5. The vinyl chloride/vinyl acetate copolymer according to Item 4, which is produced by using, as the mercapto compound having a heterocyclic group, 2-mercaptobenzimidazole and/or 2-mercaptobenzothiazole.
6. The vinyl chloride/vinyl acetate copolymer according to Item 4 or 5, which is produced by adding at least one monomer having a group selected from a sulfonic group, a metal sulfonate group and a hydroxyl group in an amount of from 0.05 to 10 wt % based on the total amount of the vinyl chloride monomer and the vinyl acetate monomer, followed by the polymerization.
7. The vinyl chloride/vinyl acetate copolymer according to any one of Items 4 to 6, which is produced by using a peroxide and a reducing agent as catalysts.
8. The vinyl chloride/vinyl acetate copolymer according to Item 7, which is produced by using an organic peroxide as said peroxide and a sodium formaldehyde sulfoxylate as said reducing agent.
9. The vinyl chloride/vinyl acetate copolymer according to any one of Items 1 to 8, which contains from 50 to 90 wt % of the vinyl chloride monomer.
10. The vinyl chloride/vinyl acetate copolymer according to any one of Items 1 to 9, which has a weight average molecular weight of from 10,000 to 70,000.

11. A binder for a magnetic recording medium, characterized by using the vinyl chloride/vinyl acetate copolymer as defined in any one of Items 1 to 10.
12. A magnetic coating material, which comprises a magnetic powder and the binder for a magnetic recording medium as defined in Item 11.
13. A magnetic recording medium, characterized by using the magnetic coating material as defined in Item 12.

Figure 1:
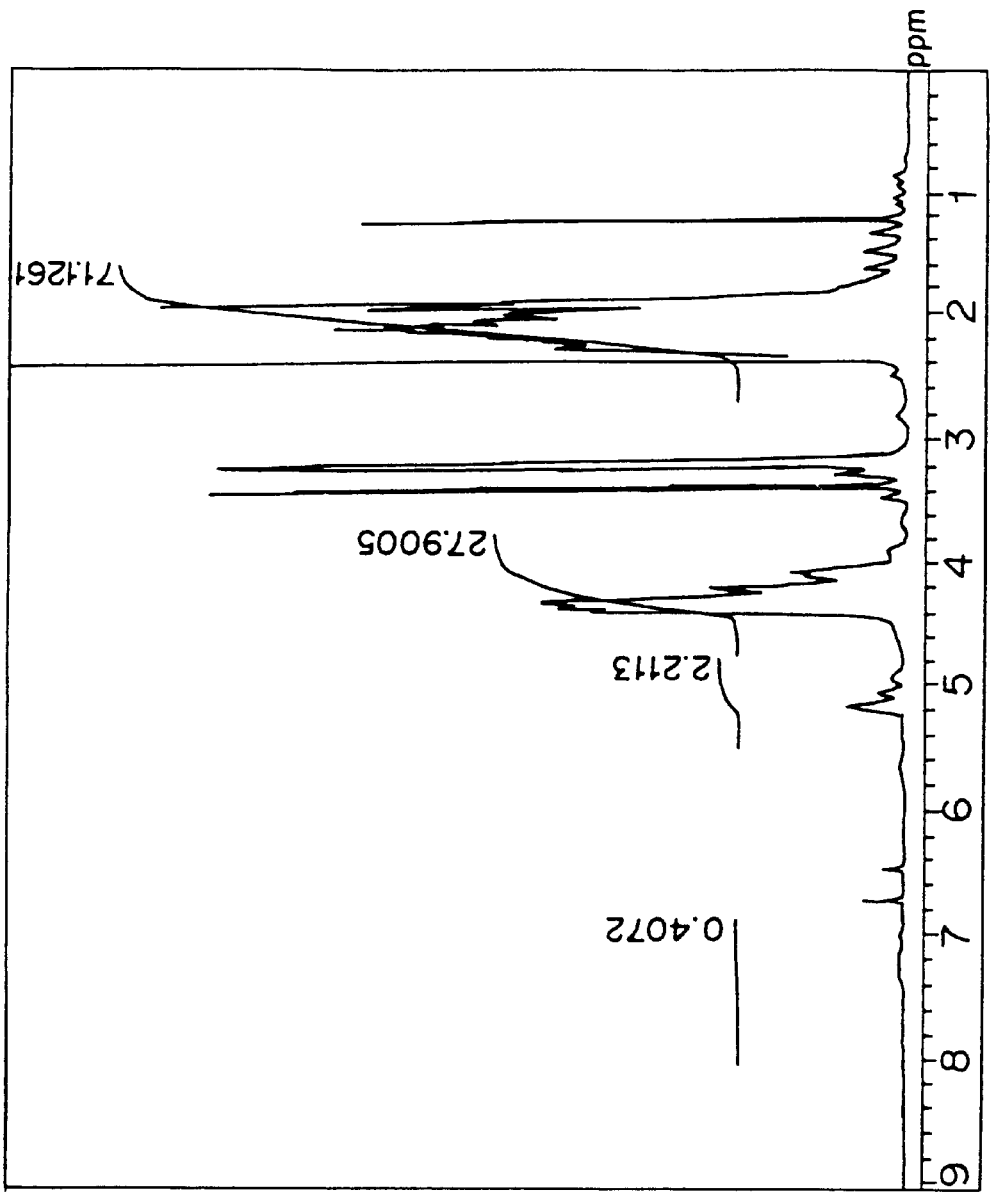
FIG. 1 is a graph showing the $^1$H-NMR measurement data of the entire copolymer of Polymerization Example 1.

Now, the present invention will be described in detail.

The binder for a magnetic recording medium of the present invention is a vinyl chloride/vinyl acetate copolymer obtained by polymerizing a vinyl chloride monomer and a vinyl acetate monomer, and is one having a mercapto compound containing a heterocyclic group added at the time of polymerization of the copolymer. Specifically, it is one obtained by adding a mercapto compound containing a heterocyclic group, which has never been used heretofore, at the time of polymerization of the copolymer, followed by suspension polymerization.

The proportion of the vinyl chloride monomer in the present invention is preferably from 50 to 90 wt %, more preferably from 65 to 90 wt %, in the total amount of monomers. The total amount of monomers means the entire monomer amount obtained by totaling the vinyl chloride monomer and the vinyl acetate monomer plus a mercapto compound containing a heterocyclic group and monomers which are subjected to copolymerization, as the case requires, such as a sulfonic group-containing monomer and a hydroxyl group-containing monomer. If the proportion is less than 50 wt %, the strength of the coating film tends to be low, and if it exceeds 90 wt %, the solubility to a solvent tends to deteriorate, such being undesirable for the production of the magnetic coating material.

The proportion of the vinyl acetate monomer in the present invention is preferably from 10 to 50 wt %, more preferably from 10 to 35 wt %, in the total amount of monomers. If it is less than 10 wt %, the solubility to a solvent tends to be low, such being undesirable for the production of a magnetic coating material. If it exceeds 50 wt %, the strength of the coating film tends to be low.

The vinyl chloride monomer and the vinyl acetate monomer may be charged into the polymerization vessel in their entire amounts from the beginning of the polymerization, or they may be continuously or intermittently added to the polymerization vessel at optional proportions during the polymerization.

The mercapto compound to be used for the vinyl chloride/vinyl acetate copolymer for a binder for a magnetic recording medium of the present invention, may be one having a heterocyclic group in its structure, preferably one containing a nitrogen atom as the hetero atom, and it may, for example, be 2-mercapto-4,6-dihydroxypyrimidine, 2-mercapto-4,6-dimethylpyrimidine, 2-mercaptothioazoline, 3-mercapto-1,2,4-triazole, 2-mercaptopyridine, 2-mercaptopyridine-N-oxide, 2-mercapto-3-phenylimidazole, 6-mercaptopurine, 2-mercaptobenzimidazole, 2-mercaptobenzothiazole, 2-mercapto-1-methylimidazole, or 5-mercapto-1-phenyltetrazole. The heterocyclic group is preferably a condensed heterocyclic group wherein one benzene ring and one five-membered ring are adjacent via one C=C double bond. From the viewpoint of large effects, 2-mercaptobenzimidazole and/or 2-mercaptobenzothiazole is more preferred.

2-Mercaptobenzimidazole or 2-mercaptobenzothiazole has been used as an antioxidation agent or a coloration-preventing agent for rubber, but it has not been added in a polymerization reaction system, and particularly, it has not been added during polymerization of a vinyl chloride/vinyl acetate copolymer. It has been unexpectedly found that by adding such a compound at the time of polymerization, the resulting vinyl chloride/vinyl acetate copolymer shows excellent dispersibility to a magnetic powder.

The precise reason has to be clarified by the future research. However, it is considered that the compound serves as a chain transfer agent and is likely to be bonded at the terminals in the copolymer, so that such terminal portions may provide effective adsorption points to the magnetic powder.

Figure 2:
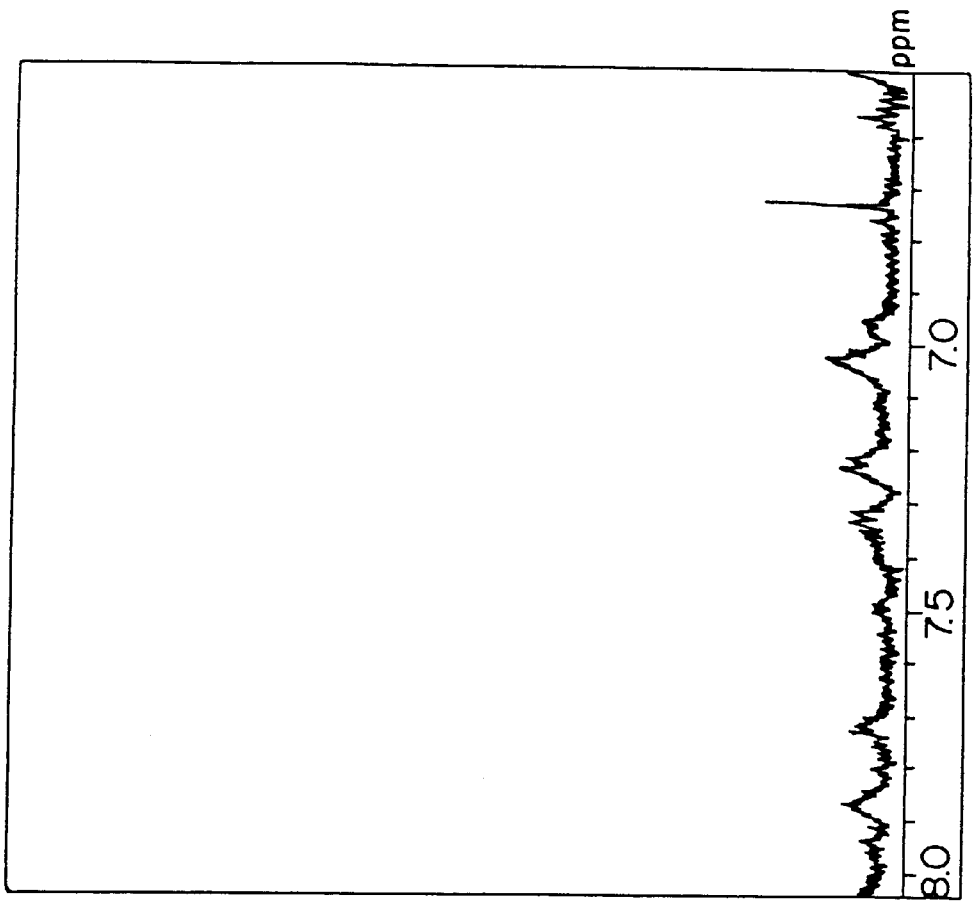
FIG. 2 is a graph showing the $^1$H-NMR measurement data from 6.5 ppm to 8.5 ppm in the copolymer of Polymerization Example 1 was enlarged 20 times.
Figure 3:
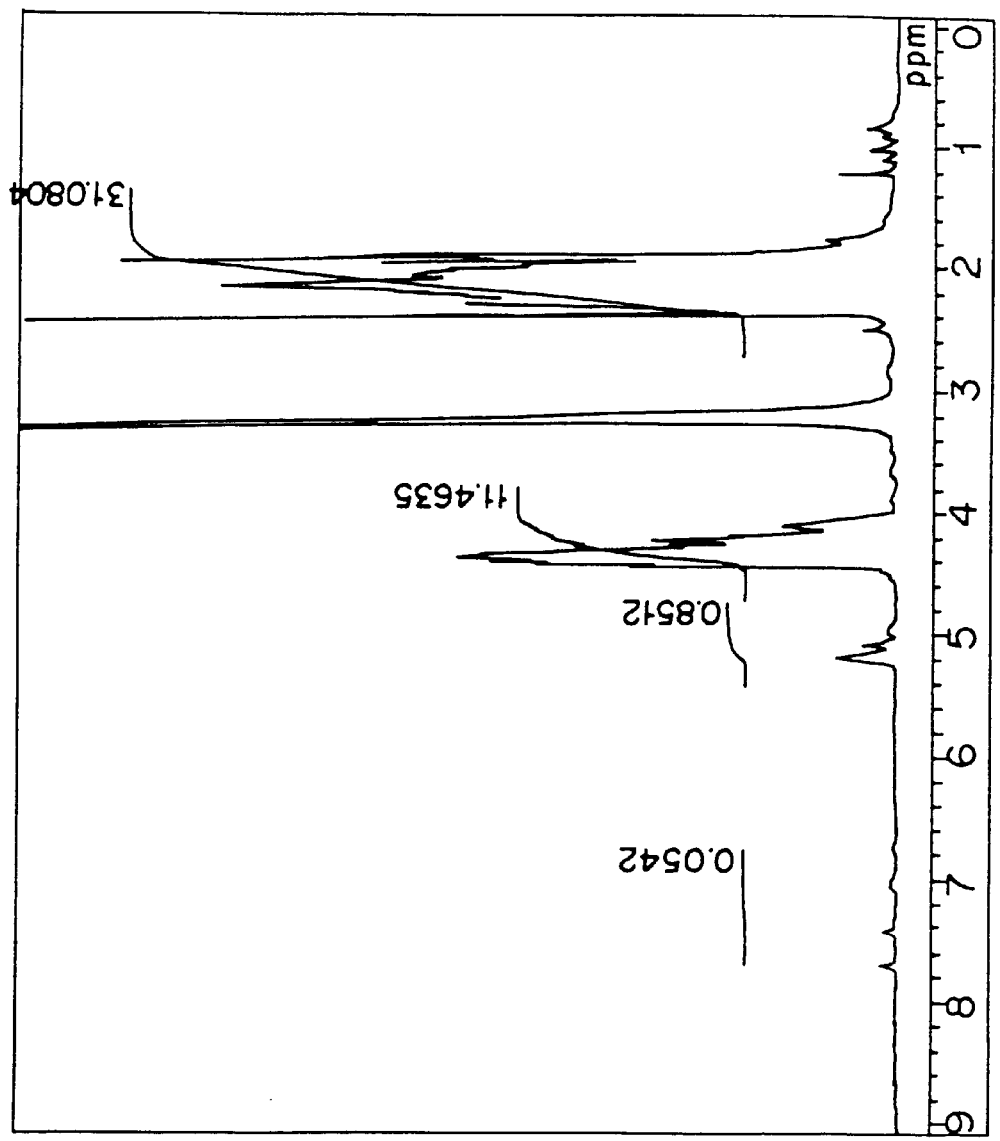
FIG. 3 is a graph showing the $^1$H-NMR measurement data of the copolymer of Polymerization Example 3.
Figure 4:
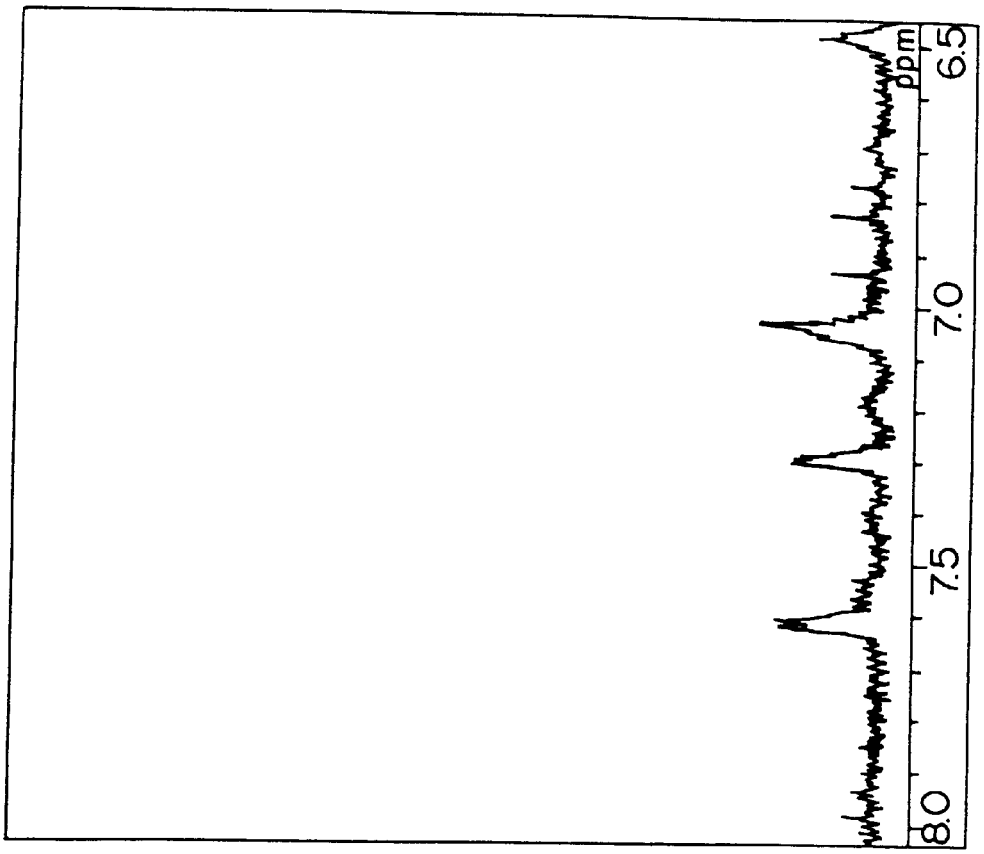
FIG. 4 is a graph showing the $^1$H-NMR measurement data from 6.5 ppm to 8.5 ppm in the copolymer of Polymerization Example 3 was enlarged 20 times.
Figure 5:
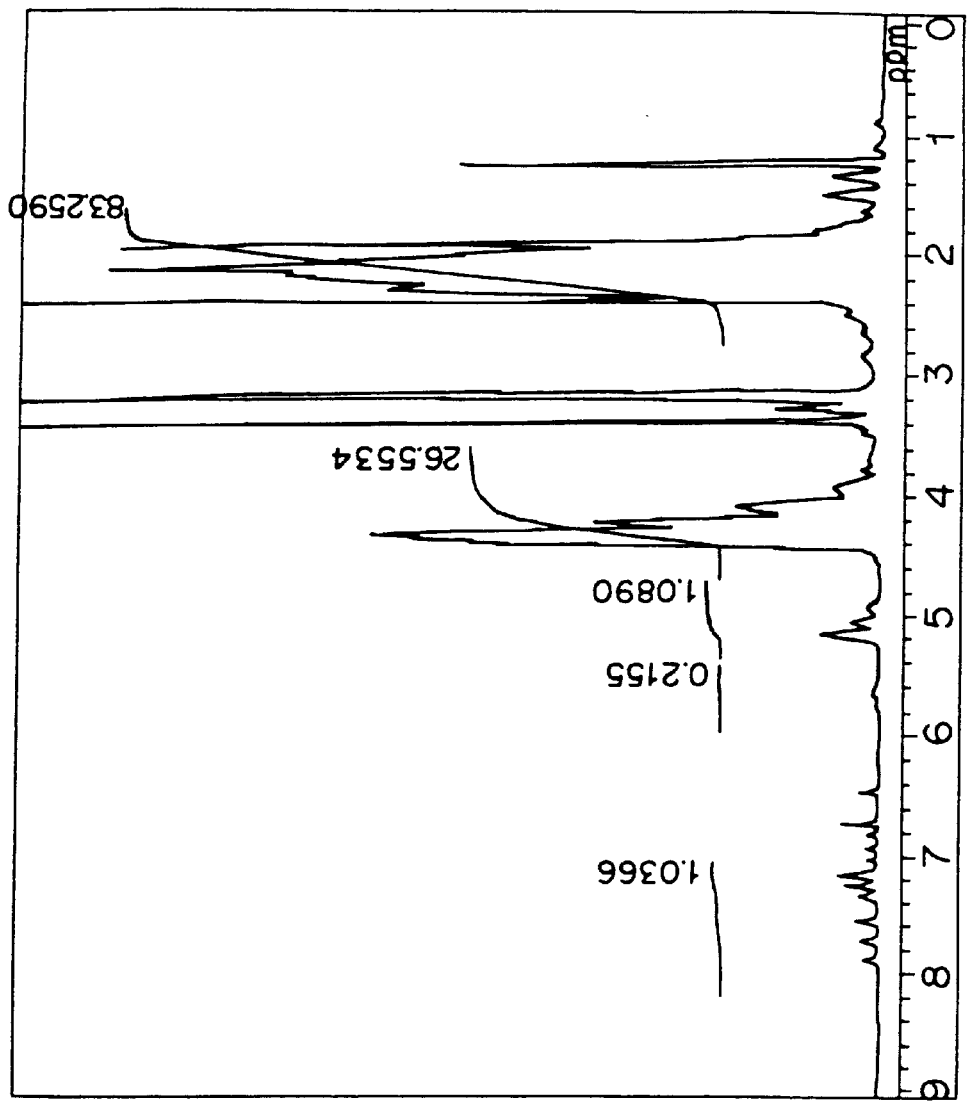
FIG. 5 is a graph showing the $^1$H-NMR measurement data of the copolymer of Polymerization Example 5.
Figure 6:
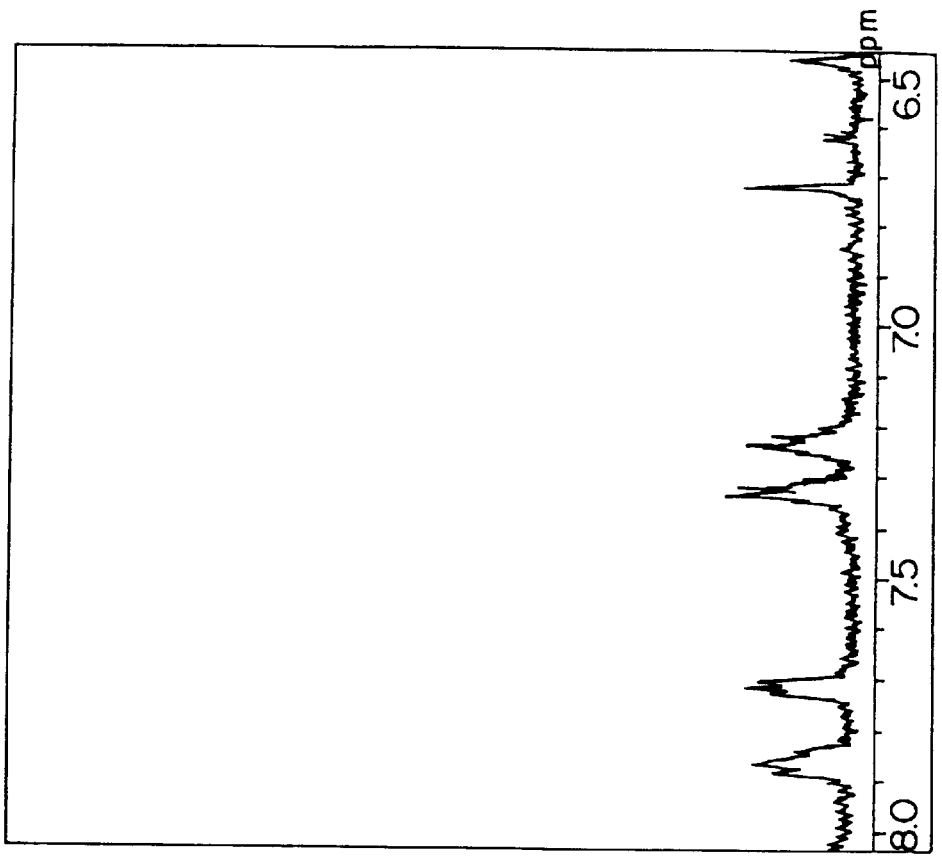
FIG. 6 is a graph showing the $^1$H-NMR measurement data from 6.5 ppm to 8.5 ppm in the copolymer of Polymerization Example 5 was enlarged 20 times.

This is assumed also from the $^1$H-NMR measurement data of the vinyl chloride/vinyl acetate copolymers, as shown in FIGS. 1 to 6. As shown in FIGS. 2, 4 and 6, if the $^1$H-NMR measurement data are enlarged 20 times, a peak of a heterocyclic group which is believed to have formed anew as a result of bonding of said compound to the terminals of the copolymer, is present within a range of from 6.0 to 8.0 ppm.

Within the range of from 6.0 to 8.0 ppm, a peak attributable to a heterocyclic group is present at a signal position of from 6.9 to 7.1 ppm, which is attributable to bonding of said compound to the terminals of the copolymer. Further, peaks attributable to a heterocyclic group are also observed at signal positions of from 7.2 to 7.4 ppm and from 7.5 to 7.7 ppm.

The mercapto compound containing a heterocyclic group is added preferably in an amount of from 0.01 to 5 parts by weight, more preferably from 0.5 to 4 parts by weight, per 100 parts by weight of the total amount of the monomers. If the amount is too small, no adequate effect for improving the dispersibility tends to be obtained. On the other hand, if it is too much, the polymerization rate remarkably decreases, probably because said compound works as a chain transfer agent, and at the same time, the molecular weight of the vinyl chloride/vinyl acetate copolymer tends to be too small.

Such mercapto compounds may be used alone or in combination as a mixture of two or more of them. For example, 2-mercaptobenzimidazole and 2-mercaptobenzothiazole may be used in combination at optional proportions, or 2-mercaptobenzimidazole and 2-mercaptobenzothiazole may be used alone, respectively.

The mercapto compound containing a heterocyclic group may be added all at once at the initial stage of the polymerization, or may be continuously or intermittently added during the polymerization at optional proportions.

The polymerization method in the present invention may be carried out in any one of solution polymerization, emulsion polymerization and suspension polymerization. However, suspension polymerization is particularly preferred. By the suspension polymerization, separation of the formed polymer is easy, and the amount of the dispersing agent can be reduced as compared with the emulsion polymerization.

It is preferred to copolymerize a monomer having a sulfonic group or a metal sulfonate group and/or a monomer having a hydroxyl group, to the vinyl chloride monomer and the vinyl acetate monomer, with a view to improving the dispersibility of the magnetic powder.

The monomer having a sulfonic group or a metal sulfonate group, may, for example, be vinyl sulfonic acid, allyl sulfonic acid or a metal salt thereof, styrene sulfonic acid (UNASS), 2-sulfoxyethyl methacrylate (2-SEMA), sulfoxypropyl acrylate or sulfoxy-t-butylacrylamide. The sulfonic group in these compounds may be of an acid form or of a metal salt form. Among them, a metal salt of allylsulfonic acid is preferred, and sodium allylsulfonate (SAS) is more preferred, since the effects are large.

The monomer having a sulfonic group or a metal sulfonate group is used preferably in an amount within a range of from 0.05 to 10 wt % in the total amount of the monomers. If the amount is less than 0.05 wt %, no adequate effects for improving the dispersibility of the magnetic powder tend to be obtained, and if it exceeds 10 wt %, no further improvement in the dispersibility may be obtained.

The monomer having a hydroxyl group may, for example, be 4-hydroxybutyl acrylate (4HBA), 4-hydroxyethyl (meth) acrylate, polypropylene glycol mono(meth)acrylate, hydroxypropyl (meth)acrylate, polyethylene glycol polypropylene glycol mono(meth)acrylate, glycerol monoallyl ether, glycerol mono(meth)acrylate, 3-chloro-2-hydroxypropyl (meth)acrylate, hydroxyethyl vinyl ether, polyethylene glycol mono(meth)acrylate, ethylene glycol monoallyl ether or hydroxybutyl vinyl ether.

The monomer having a hydroxyl group is used preferably in an amount within a range of from 0.05 to 10 wt % in the total amount of the monomers. If it is less than 0.05 wt %, no adequate effects for improving the dispersibility of the magnetic powder tend to be obtained, and if it exceeds 10 wt %, no further improvement of the dispersibility may be expected.

The vinyl chloride/vinyl acetate copolymer of the present invention is produced preferably by copolymerizing the monomers by adding a catalyst such as a polymerization initiator or a redox catalyst having a polymerization initiator and a reducing agent combined, to the monomers. Among these catalysts, a redox catalyst is preferred.

The polymerization initiator, so-called a catalyst, is preferably one which is water-soluble. For example, a persulfate such as ammonium persulfate or potassium persulfate, hydrogen peroxide or an organic peroxide such as t-butyl hydroperoxide (tBHP), may be employed. Particularly preferred is t-butyl hydroperoxide with a view to improving the dispersibility.

The polymerization initiator is used preferably in an amount within a range of from 0.1 to 10 parts by weight per 100 parts by weight of the total amount of the monomers. If the amount is less than 0.1 part by weight, the polymerization rate tends to be small, and if it exceeds 10 parts by weight, it tends to be difficult to adjust the polymerization rate, and such is undesirable also from the economical viewpoint.

The above-mentioned so-called redox catalyst having a polymerization initiator and a reducing agent combined, can be preferably used in the present invention. As the reducing agent, a sodium formaldehyde sulfoxylate (SFS), a zinc formaldehyde sulfoxylate, vitamin C, urea, thiourea or an amine may, for example, be used. Particularly preferred is a sodium formaldehyde sulfoxylate with a view to improving the dispersibility.

With such a redox catalyst, a catalyst such as an organic peroxide may be dissolved in water and charged into the polymerization vessel, and an aqueous solution of the reducing agent may continuously or intermittently be added. Otherwise, the reducing agent may be dissolved in water and charged into the polymerization vessel, and the catalyst such as an organic peroxide may be continuously or intermittently added as it is or in the form of an aqueous solution.

The reducing agent is used preferably in an amount within a range of from 0.1 to 20 parts by weight, per 100 parts by weight of the total amount of the monomers. If the amount is less than 0.1 part by weight, no adequate effect tends to be obtained, and if it exceeds 20 parts by weight, it tends to be difficult to adjust the polymerization rate, and such is undesirable also from the economical viewpoint.

The polymerization temperature for producing the vinyl chloride/vinyl acetate copolymer of the present invention may usually be set depending upon the type of the catalyst which is used for the suspension polymerization, and it is not particularly restricted.

A dispersing agent may not be used for the suspension polymerization of the present invention. However, it is preferred to use a dispersing agent. A dispersing agent which is commonly used for the suspension polymerization of a vinyl chloride copolymer, may be used. For example, a water-soluble polymer such as hydroxycellulose (HEC), polyvinyl alcohol, ethyl cellulose or polyethylene oxide may, for example, be employed.

The dispersing agent is used preferably in an amount within a range of from 0.01 to 5 parts by weight per 100 parts by weight of the total amount of the monomers. If the amount is less than 0.01 part by weight, the dispersibility tends to be small, and if it exceeds 5 parts by weight, foaming tends to be substantial, and such may be undesirable also from the economical viewpoint.

The molecular weight of the vinyl chloride/vinyl acetate copolymer of the present invention is preferably from 5,000 to 100,000, more preferably from 10,000 to 70,000, by a weight average molecular weight as calculated as polystyrene measured by GPC. If the molecular weight is less than 5,000, the durability of the coating film tends to be poor, although the dispersibility may be good, and if it exceeds 100,000, the dispersibility of the magnetic powder tends to be poor.

The vinyl chloride chloride/vinyl acetate copolymer obtained by the present invention, is useful as a binder for a magnetic recording medium during the production of a magnetic coating material. When it is used as a binder for a magnetic recording medium, other resins may be incorporated, as the case requires. As such resins, various resins such as polymers or copolymers, including, for example, a polyurethane resin, nitrocellulose, a polyester resin, an epoxy resin, a polyamide resin, a phenol resin, an alkyd resin and a polyvinyl acetal resin, may be mentioned. Further, for the purpose of imparting strength to the coating film of the magnetic coating material, it is preferred to incorporate a polyisocyanate type curing agent.

The binder for a magnetic recording medium obtained by the present invention is mixed with a magnetic powder and used as a magnetic coating material.

The magnetic powder to be used for the magnetic coating material of the present invention, may, for example, be a metal powder (Fe), a magnetite powder ($Fe_3O_4$) or an iron oxide such as $\gamma$-$Fe_2O_3$, or one having cobalt ions doped or adsorbed thereto, as well as metal or alloy needle-like fine particles having $CrO_2$ or $CrO_2$ plus Fe, Co, Fe—Co or Ni incorporated, or other conventional various magnetic powders. Among them, a metal powder or a magnetite powder is preferred, since the effects are large.

With respect to the mixing proportions of the magnetic powder and the binder for a magnetic recording medium, it is preferred that the binder for a magnetic recording medium is from 5 to 50 parts by weight, more preferably from 10 to 40 parts by weight, per 100 parts by weight of the magnetic powder. If the amount is less than 10 parts by weight, the action for maintaining the magnetic powder tends to be small, whereby the durability tends to deteriorate, and if it exceeds 40 parts by weight, the proportion of the magnetic powder in the magnetic layer tends to be small, whereby the desired recording density tends to be hardly obtainable.

To uniformly disperse the magnetic powder and the binder for a magnetic recording medium, a lubricant, an abrasive, an antistatic agent, a dispersing adjuvant or a rust-preventing agent may be added, and various organic solvents such as methyl ethyl ketone, methyl isobutyl ketone, cyclohexanone and toluene, may be used as a solvent for the coating material.

As the support, a synthetic resin such as polyester, polyolefin, cellulose acetate or polycarbonate, a non-magnetic metal, or a ceramic may, for example, be used. It may be used in the form of a film, a tape, a sheet or a plate. As a coating means for forming a magnetic layer on the support, a conventional method may be employed, and if necessary, flattening treatment such as calendering may be applied, to obtain the desired magnetic recording medium of the present invention.

Now, the present invention will be described in further detail with reference to Examples. However, it should be understood that the present invention is by no means restricted to such specific Examples.

EXAMPLE 1

Into an autoclave equipped with a stirrer, 425 g (85 wt % in the entire monomers) of a vinyl chloride monomer, 57.5 g (12.5 wt % in the entire monomers) of a vinyl acetate monomer, 1,500 g of pure water, 2.6 g (0.5 wt % in the entire monomers) of sodium allylsulfonate, 6 g (1 part by weight per 100 parts by weight of the entire monomers) of t-butyl hydroperoxide, 5 g (1 part by weight per 100 parts by weight of the entire monomers) of polyethylene oxide, 5 g (1 part by weight per 100 parts by weight of the entire monomers) of 2-mercaptobenzimidazole and 5 g (1 part by weight per 100 parts by weight of the entire monomers) of 2-mercaptobenzothiazole were charged. The air in the interior was replaced by nitrogen, and a 10 wt % aqueous solution of sulfoxylic acid/formaldehyde was continuously added in a total amount of 5 g as calculated as solid content, over a period of 4 hours, while maintaining the temperature at 50° C. At the same time, 15 g of 4-hydroxybutyl acrylate was added over a period of 3 hours. To accelerate the polymerization as the case requires, t-butyl hydroperoxide was added. The formed product was washed with water and dried to obtain a copolymer.

The polymerization formulation and the physical properties of the copolymer are shown in the Polymerization Example 1 of Table 1.

In Polymerization Example 1, $^1$H-NMR measurement was carried out, and the data of the copolymer are shown in FIG. 1, and the data from 6.5 ppm to 8.5 ppm enlarged, are shown in FIG. 2.

EXAMPLES 2 to 5

Polymerization was carried out in the same manner as in Example 1 except that the starting materials were changed as shown in Table 1, to obtain the respective vinyl chloride/vinyl acetate copolymers. The physical properties of the these copolymers were evaluated and shown in Table 2.

Further, with respect to Polymerization Examples 3 and 5, $^1$H-NMR measurements were carried out, and the data of the copolymer of Polymerization Example 3 are shown in FIG. 3, and the data from 6.5 ppm to 8.5 ppm enlarged are shown in FIG. 4. The data of the entire copolymer of Polymerization Example 5 are shown in FIG. 5 and the data from 0.5 ppm to 8.5 ppm enlarged, are shown in FIG. 6.

Comparative Examples 1 to 4

Polymerization was carried out in the same manner as in Example 1 except that the starting materials as identified in Table 1 were employed, to obtain the respective copolymers. The physical properties of these copolymers were evaluated and presented in Table 2.

The respective evaluations were carried out by the following methods.

(1) Evaluation of the Polymer Composition

Vinyl chloride: Measured by an elemental analysis of chlorine.

Sulfonic group: The sulfur element was quantified by an elemental analysis, to analyze the sulfonic group.

Hydroxyl group: Measured by $^1$H-NMR.

(2) Evaluation of the Weight Average Molecular Weight

The obtained copolymer was diluted with THF to obtain a solution having a concentration of 0.1%. The weight average molecular weight was measured as calculated as polystyrene in accordance with the GPC measuring method by using TOSOH HLC-8120A by Tosoh Corp. as the measuring machine.

(3) Evaluation of the $^1$H-NMR Measurement

Measured by using deuterated DMSO as a solvent with an observation width of 8000 Hz by using JNM-ALPHA500, manufactured by Nihon Denshi, as the measuring machine.

Tests on physical properties as a magnetic recording medium:

(4) Evaluation by a Metal Magnetic Powder 12.5 g of the copolymer to be evaluated, 100 g of a metal magnetic powder, 108 g of methyl ethyl ketone, 108 g of toluene, 54 g of cyclohexanone, 0.6 g of stearic acid and 0.3 g of n-butyl stearate, were charged together with glass beads into a sand grinder and kneaded for 4 hours. The formed magnetic coating material was coated on a film by means of a 1 mil doctor blade. In a magnetic field of 2000 Oe, the magnetic powder was aligned and then dried to obtain a film having a magnetic layer. The magnetic coating material and the film having a magnetic layer were evaluated by the following methods.

Evaluation Methods

Gloss: With respect to the film having a magnetic layer, the gloss was measured by a gloss meter by MURAKAMI COLOR RESEARCH LABORATORY at an angle of 60° from the transverse direction to the coating direction of the coating film.

Fluidity of the magnetic coating material: The container containing the magnetic coating material was inclined and the fluidity was visually evaluated. Symbol o indicates that the fluidity is good, symbol * indicates that the fluidity is slightly poor, symbol ** indicates that no fluidity is observed.

Viscosity (shear stress) of the magnetic coating material: Using a viscometer manufactured by HAAKE Co., the shearing stress was measured at 25° C. at a shearing rate of 0.25/s.

Viscosity of the magnetic coating material: Using a B-Model viscometer, the viscosity of the magnetic coating material was measured at 25° C. at 60 rpm.

Squareness ratio: Measured by a vibration sample type magnetic force meter manufactured by Toei Kogyo K.K.

(5) Evaluation by a Magnetite Magnetic Powder 20 g of the copolymer to be evaluated, 100 g of a magnetite magnetic powder, 104 g of methyl ethyl ketone, 104 g of toluene and 52 g of cyclohexanone were charged together with glass beads into a sand grinder and kneaded for 4 hours. The formed magnetic coating material was coated on a PET film by means of a 1 mil doctor blade. In a magnetic field of 2000 Oe, the magnetic powder was aligned and then dried to obtain a film having a magnetic layer. With respect to the magnetic coating material and the film having a magnetic layer, the above-described evaluation was carried out.

TABLE 1

|  | Polymerization Example 1 | Polymerization Example 2 | Polymerization Example 3 | Polymerization Example 4 | Polymerization Example 5 | Comparative Polymerization Example 1 | Comparative Polymerization Example 2 | Comparative Polymerization Example 3 | Comparative Polymerization Example 4 |
|---|---|---|---|---|---|---|---|---|---|
| Vinyl chloride monomer (wt %) | 85 | 85 | 85 | 85 | 85 | 85 | 85 | 85 | 85 |
| Vinyl acetate monomer (wt %) | 12.5 | 14.5 | 10.5 | 15 | 14.5 | 15 | 14 | 10 | 14.5 |
| Sulfonic group-containing monomer (wt %) | | | | | | | | | |
| SAS | 0.5 | 0.5 | 0.5 | 0 | 0.5 | 0 | 0 | 0 | 0 |
| 2-SEMA | 0 | 0 | 0 | 0 | 0 | 0 | 1 | 5 | 0.5 |
| UNASS | 0 | 0 | 0 | 0 | 0 | 0 | 0 | 0 | 0 |
| Hydroxyl group-containing monomer (wt %) | | | | | | | | | |
| 4HBA | 3 | 0 | 4 | 0 | 0 | 0 | 0 | 0 | 0 |
| Total amount of monomers (wt %) | 100 | 100 | 100 | 100 | 100 | 100 | 100 | 100 | 100 |
| Heterocyclic group-containing mercapto compound (parts by weight) | | | | | | | | | |
| 2-Mercaptobenzimidazole | 1 | 2 | 2 | 2 | 0 | 0 | 0 | 0 | 0 |
| 2-Mercaptobenzothlazole | 1 | 0 | 0 | 0 | 2 | 0 | 0 | 0 | 0 |
| Chain transfer agent (parts by weight) | | | | | | | | | |
| TCE | 0 | 0 | 0 | 0 | 0 | 0 | 0 | 3 | 0 |
| Laurylmercaptane | 0 | 0 | 0 | 0 | 0 | 0 | 0 | 0 | 2.5 |
| Catalyst (parts by weight) | | | | | | | | | |
| tBHP | 1 | 1 | 1 | 1 | 1 | 1 | 1 | 1 | 1 |
| SPS | 1 | 1 | 1 | 1 | 1 | 1 | 1 | 1 | 1 |
| Water (g) | 1500 | 1500 | 1500 | 1500 | 1500 | 1500 | 1500 | 1500 | 1500 |
| Dispersant (parts by weight) | | | | | | | | | |
| Polyechylene oxide | 1 | 0 | 0 | 1 | 1 | 0 | 0 | 0 | 1 |
| HEC | 0 | 0 | 0 | 0 | 0 | 0.5 | 0.5 | 1 | 0 |

Note 1
Each monomer is represented by wt % in the entire monomers, and the heterocyclic group-containing mercapto Compound, the chain transfer agent, the catalyst and the dispersant represent parts by weight per 100 parts by weight of the entire monomers.

TABLE 2

| Resins used | Example 1 Polymerization Example 1 | Example 2 Polymerization Example 2 | Example 3 Polymerization Example 3 | Example 4 Polymerization Example 4 | Example 5 Polymerization Example 5 | Comparative Example 1 Comparative Polymerization Example 1 | Comparative Example 2 Comparative Polymerization Example 2 | Comparative Example 3 Comparative Polymerization Example 3 | Comparative Example 4 Comparative Polymerization Example 4 |
|---|---|---|---|---|---|---|---|---|---|
| Polymer composition (wt %) | | | | | | | | | |
| Vinyl chloride | 83.1 | 87.3 | 85.9 | 86.1 | 83.2 | 81.0 | 84.9 | 84.5 | 82.9 |
| Sulfonic group | 0.3 | 0.8 | 0.9 | 0 | 0.8 | 0 | 0.6 | 4.7 | 0.5 |
| Hydroxyl group | 2.7 | 0 | 3.6 | 0 | 0 | 0 | 0 | 0 | 0 |
| Weight average molecular weight | 28600 | 19200 | 48500 | 21100 | 29000 | 71800 | 71400 | 33500 | 15300 |

TABLE 2-continued

|  | Example 1 Polymerization Example 1 | Example 2 Polymerization Example 2 | Example 3 Polymerization Example 3 | Example 4 Polymerization Example 4 | Example 5 Polymerization Example 5 | Comparative Example 1 Comparative Polymerization Example 1 | Comparative Example 2 Comparative Polymerization Example 2 | Comparative Example 3 Comparative Polymerization Example 3 | Comparative Example 4 Comparative Polymerization Example 4 |
|---|---|---|---|---|---|---|---|---|---|
| Resins used |  |  |  |  |  |  |  |  |  |
| Evaluation of metal magnetic powder |  |  |  |  |  |  |  |  |  |
| Gloss Initial | 149 | 146 | 140 | 136 | 129 | 25 | 29 | 12 | 82 |
| Gloss One day later | 145 | 145 | 126 | 133 | 127 | — | — | — | — |
| Fluidity Initial | ○ | ○ | ○ | ○ | ○ | ** | ** | * | ** |
| Shear stress Initial | 4.8 | 3.4 | 5.3 | 4.1 | 3.9 | — | — | 1.9 | 14.5 |
| Viscosity Initial | 1280 | 850 | 1780 | 1400 | 780 | — | — | 780 | 1300 |
| Viscosity One day later | 1470 | 1000 | 2150 | 1600 | 980 | — | — | — | — |
| Squareness ratio | 0.85 | 0.84 | 0.83 | 0.81 | 0.80 | 0.70 | 0.72 | 0.68 | 0.74 |
| Evaluation of magnetite magnetic powder |  |  |  |  |  |  |  |  |  |
| Gloss Initial | 94 | 92 | 89 | 85 | 99 | — | — | — | — |
| Gloss One day later | 92 | 93 | 88 | 85 | 99 | — | — | — | — |
| Fluidity Initial | ○ | ○ | ○ | ○ | ○ | — | — | — | — |
| Shear stress Initial | 8.3 | 5.9 | 8.8 | 4.1 | 3.8 | — | — | — | — |
| Viscosity Initial | 2600 | 2030 | 2950 | 3320 | 900 | — | — | — | — |
| Viscosity One day later | 2970 | 2300 | 3450 | 3820 | 1020 | — | — | — | — |
| Squareness ratio | 0.82 | 0.82 | 0.80 | 0.79 | 0.79 | — | — | — | — |

Note 2
The polymer composition represents wt % in the total monomers. The unit of gloss is %, the unit of shear stress is Pa, and the unit of viscosity is mPa · s.
The symbol "—" in Comparative Examples means "not measurable".

As is evident from Tables 1 and 2, the vinyl chloride/vinyl acetate copolymers of Polymerization Examples 1 to 5 all fall within the range of the present invention, and as is evident from the evaluation results of Examples 1 to 5 employing them (Table 2), they show excellent gloss, shearing stress and viscosities with the metal magnetic powder and the magnetite magnetic powder and show little change with time. Whereas, in the Comparative Polymerization Examples, no mercapto compound containing a heterocyclic group was added during the polymerization, whereby in Comparative Examples 1 to 4, the gloss was very poor with the metal magnetic powder.

In Comparative Polymerization Examples 3 and 4, trichlene (TCE) or laurylmercaptane was used as a chain transfer agent, but no good performance was obtained as mentioned above.

As described in the foregoing, according to the present invention, the vinyl chloride/vinyl acetate copolymer obtained by adding a mercapto compound having a heterocyclic group during the preparation of a binder for a magnetic recording medium, followed by suspension polymerization, exhibits excellent performance in dispersibility of various magnetic powders. Namely, when it is used for a magnetic coating material, an increase in the viscosity is small even when the magnetic coating material is left to stand after its preparation, and a decrease in the gloss of the magnetic layer is small. Further, it exhibits excellent dispersing abilities to various magnetic powders, whereby a novel magnetic recording medium having excellent magnetic properties, can be provided.

What is claimed is:

1. A magnetic coating material comprising a magnetic powder and a binder for a magnetic recording medium, wherein said binder comprises a vinyl chloride/vinyl acetate copolymer characterized in that it has a peak at a signal position of from 6.0 to 8.0 ppm in the $^1$H-NMR measurement.

2. A magnetic coating material comprising a magnetic powder and a binder for a magnetic recording medium, wherein said binder comprises a vinyl chloride/vinyl acetate copolymer characterized in that it has a peak at a signal position of from 6.9 to 7.1 ppm in the $^1$H-NMR measurement.

3. A magnetic coating material comprising a magnetic powder and a binder for a magnetic recording medium, wherein said binder comprises a vinyl chloride/vinyl acetate copolymer characterized in that it has peaks at respective signal positions of from 6.9 to 7.1 ppm, from 7.2 to 7.4 ppm and from 7.5 to 7.7 ppm in the $^1$H-NMR measurement.

4. The magnetic coating material of claim 1, wherein the vinyl chloride/vinyl acetate copolymer is produced by adding a vinyl chloride monomer, a vinyl acetate monomer and from 0.01 to 5 wt %, based on the total amount of the monomers, of a mercapto compound containing a heterocyclic group, followed by suspension polymerization.

5. The magnetic coating material of claim 4, wherein the vinyl chloride/vinyl acetate copolymer is produced by using, as the mercapto compound having a heterocyclic group, 2-mercaptobenzimidazole, a 2-mercaptobenzothiazole, or a mixture thereof.

6. The magnetic coating material of claim 4, wherein the vinyl chloride/vinyl acetate copolymer is produced by further adding at least one monomer having a group selected from the group consisting of a sulfonic group, a metal sulfonate group and a hydroxyl group in an amount of from 0.05 to 10 wt % based on the total amount of the vinyl chloride monomer and the vinyl acetate monomer, followed by the polymerization.

7. The magnetic coating material of claim 4, wherein the vinyl chloride/vinyl acetate copolymer is produced by using a peroxide and a reducing agent as catalysts.

8. The magnetic coating material of claim 7, wherein the vinyl chloride/vinyl acetate copolymer is produced by using an organic peroxide as said peroxide and a sodium formaldehyde sulfoxylate as said reducing agent.

9. The magnetic coating material of claim 1, wherein the vinyl chloride/vinyl acetate copolymer contains from 50 to 90 wt % of the vinyl chloride monomer.

10. The magnetic coating material of claim 1, wherein the vinyl chloride/vinyl acetate copolymer has a weight average molecular weight of from 10,000 to 70,000.

11. A magnetic recording medium obtained by forming a layer of the magnetic coating material as defined in claim 1 on a support.

12. The magnetic coating material of claim 1, wherein the binder is present in an amount of 5 to 50 parts by weight per 100 parts by weight of the magnetic powder.

13. The magnetic coating material of claim 1, wherein the binder is present in an amount of 10 to 40 parts by weight per 100 parts by weight of the magnetic powder.

* * * * *